United States Patent Office 3,498,789
Patented Mar. 3, 1970

3,498,789
PHOTOGRAPHIC ELEMEMNT HAVING A NOVEL FILTER LAYER THEREON
Edward A. Sutherns, Joseph Bailey, and Colin Holsted, Hertfordshire, England, assignors to Eastman Kodak Company, Rochester, N.Y., a corporation of New Jersey
No Drawing. Filed Mar. 13, 1967, Ser. No. 622,442
Int. Cl. G03c 1/84
U.S. Cl. 96—84                    19 Claims

ABSTRACT OF THE DISCLOSURE

A light-sensitive, silver halide photographic element comprising a support, at least one silver halide layer and a layer containing a dye precursor which is positioned further from said support than any silver halide layer. In one aspect the dye precursors can be converted to light absorbing dyes upon treatment with a simple acid or base solution. The dye precursor layer permits exposure for print-out or direct-print materials but can be easily converted to a light absorbing layer to minimize further exposure by light of the lower wavelengths.

---

This invention relates to novel photographic elements and methods for processing said elements. In one aspect this invention relates to a novel photographic composition with a layer containing a dye precursor which can be converted to a dye which absorbs substantial amounts of radiation below 460 millimicrons. In another aspect, this invention relates to a novel print-out or direct-print photographic element with a layer containing a dye precursor which can be converted to a dye after image formation in the element, said dye being absorbant to light which will deteriorate the image discrimination in said element. In still another aspect this invention relates to a method for processing novel photographic elements to provide a filter layer on said element.

Various types of filter layers have been used to protect photographic images from deterioration by prolonged exposure to radiation. Photographic elements containing developed images have been overcoated with layers containing dyes which absorb harmful radiation. The application of this layer is a time-consuming operation requiring elaborate coating and drying equipment. A fast and simple method for forming the filter layer on a photographic element after image formation and development is desirable. Moreover, with print-out emulsions and direct-print emulsions which require only exposure or exposure followed by photodevelopment of the image, a simple means for forming a filter layer would be very desirable to prevent deterioration of image discrimination which readily occurs in most print-out emulsions and in some direct-print emulsions.

It is, therefore, an object of this invention to provide a novel photographic element.

It is another object of this invention to povide a novel photographic element with a layer containing a dye precursor which can be converted to a light absorbing dye.

It is another object of this invention to provide a print-out or direct-print silver halide photographic element with a layer containing a dye precursor which will allow imagewise exposure and photodevelopment of said silver halide followed by conversion of said dye precursor to a dye capable of absorbing light up to 460 millimicrons.

It is another object of this invention to provide a novel protective layer for direct-print and print-out silver halide photographic elements.

It is still another object of this invention to provide a means for forming a light absorbing layer on a photographic element by contact with a simple solution.

These and other objects of the invention are accomplished with a photographic element having a dye precursor in one layer of said element. In one aspect of this invention a layer containing a dye precursor which can be converted to a dye capable of absorbing light of wavelength up to 460 millimicrons is superimposed on a print-out or direct-print emulsion. After the visible image is formed, the layer is contacted with an acid or basic solution to convert the precursor to a light absorbant dye. The dye precursor preferably does not absorb light beyond the 300 millimicron range. In another aspect of this invention a color coupler is incorporated in the filter layer of the print-out or direct-print photographic element. After a visible image has been formed the element is contacted with an oxidized developer solution to form a light absorbant compound in the filter layer.

The dye precursors of this invention are generally lightly colored or colorless compounds which form highly colored compounds or salts upon treatment with an activator solution such as acid, base, oxidized developer and the like. Where the dye precursors are used for a filter layer for print-out or direct-print emulsions the dye precursor should not absorb any substantial amount of radiation above the 300 millimicron range as sufficient light must pass through the layer to achieve imagewise exposure and photodevelopment in the case of direct-print materials. Light in the range of 300–460 millimicrons is generally used for exposing and photodeveloping most conventional print-out or direct-print emulsions as the silver halide is light sensitive in that region. Of course, if sensitizing dyes are used to extend the range of the emulsion sensitivity the dye precursor absorption could extend above 300 millimicrons and allow exposure and photodevelopment of the emulsion. The dye must not, however, absorb substantial amounts of light above the 460–500 millimicron range as it would camouflage the image in the emulsion layer.

Typical dye precursors which will not have substantial light absorption above 300 millimicrons, but which can be converted to compounds or salts having substantial light absorption properties for use as filter layers are the color couplers, leuco compounds, and the general acid-base indicator-type dyes. Typical leuco dyes are substituted phenols, triarylmethane dyes, triarylmethane dyes having one or more bridging hetero atoms and the like. Typical color couplers are the open-chain methylene coupler compounds such as described in Weissberger U.S. Patent No. 2,407,210; McCrossen et al. U.S. Patent No. 2,875,057; and Weissberger et al. U.S. Patent No. 3,265,506.

The preferred acid-base indicator dyes used in this invention are of the type that form an orange or yellow color upon contact with acid or base, for example, Eosin yellow CI 768, color change at pH 2–3.5; Acridine orange CI 788, color change at pH 3–4.0; Erythrosin, color change at 4.0–6.0; Resorufin, color change at 8.0–10.0; Bis(1 - butyl - 2,5-dimethyl-3-pyrrole)methincyanine perchlorate and the like. The preferred substituted phenol dye precursors are compounds such as p-nitrophenol, p-diazodiethylaniline mixed with acetoacetanilide, 2-nitro-4n-octyl phenol, 4-nitro-2,6-dichloro phenol and the like. The preferred color couplers are the yellow dye-forming, open-chain methylene couplers such as, for example, 4-benzoylacetamido - 3 - methoxy - (2′,4′-di-t-amylphenoxy)acetanilide and the like.

The dye precursors of this invention can be added to a colloid layer by mere addition or a dye-mordant can be included in the layer to prevent migration of the dye in the event non-wandering of the dye is desirable. When a combination of compounds is necessary to form the dye a non-wandering mordant is used to prevent migration of at least one of the precursor components. The dye mordants useful in this invention include generally any mordant used in the photographic art to prevent migration of dyes and couplers such as disclosed in British specification 850,281.

The dye precursor is generally coated in a separate layer supercoated on the silver halide emulsion. The binder may be any suitable material having sufficient porosity to allow contact of the dye with the treatment solution. Satisfactory colloids which can be used for this purpose include any of the hydrophilic colloids generally employed in the photographic field including, for example, gelatin, colloidal albumin, polysaccharides, cellulose derivatives, synthetic resins such as polyvinyl compounds, including polyvinyl alcohol derivatives, acrylamide polymers and the like. In addition to the hydrophilic colloids, the vehicle or binding agent can contain hydrophobic colloids such as dispersed polymerized vinyl compounds. Suitable compounds of this type include water insoluble polymers of alkyl acrylates or methacrylates, acrylic acid, sulfoalkyl acrylates or methacrylates and the like.

The photographic composition used in combination with the dye precursors can be any type of emulsion including conventional silver halide emulsions precipitated in a gelatinous medium, vacuum deposited silver halide and the like. The dye precursors have been found to be very effective in retarding deterioration of direct-print images such as those prepared according to McBride, U.S. Patent No. 3,271,157; McBride, U.S. Patent No. 3,287,136 and Hunt, U.S. Patent No. 3,033,682 and in print-out images in emulsions, for example, those prepared according to Davey et al., U.S. Patent No. 2,592,250 and Glafkides, Photographic Chemistry, vol. 1, pp. 31–2, Fountain Press, London. In direct-print papers a latent image can be found by a brief exposure to a high intensity light and the image can be developed by photodevelopment with exposure to room light or fluorescent lamps. In the preferred types of direct-print emulsions an emulsion comprising silver halide grains having a predominant amount of sensitivity internal to said grains is used in combination with a halogen acceptor to achieve good image properties. The emulsions are further described in McBride above mentioned.

The precursor layer, which can be converted to a filter, is generally employed as the outermost layer of a photographic element. However, additional layers can be superimposed on the filter element as long as the precursor layer is positioned further from the support than the silver halide layer it protects when converted to the radiation absorbing compound. All of the silver halide layers are located between the precursor layer and the support in the preferred embodiments to obtain maximum absorption of the radiation before it approaches the silver halide. Therefore, in a typical preferred embodiment the precursor layer is substantially free of silver halide.

The precursor layer obviates the rather complex operation of coating a filter layer on the photographic element after the image is formed. It is also a simple operation to contact the precursor layer with a stable solution as opposed to utilizing complex dye solutions, which are usually unstable, to provide a radiation filtering means on the element after the image has been formed in said element.

The invention can be further illustrated by the following examples of preferred embodiments thereof, although it will be understood that the examples are included merely for the purpose of illustration and are not intended to limit the scope of the invention unless otherwise specifically indicated.

EXAMPLE 1

Direct-print recording paper having a layer of photodevelopable silver chlorobromide emulsion is coated on the emulsion side with various aqueous dispersions of dye precursors. The dispersions each contain 9% by weight gelatin and are adjusted to a pH of 3.5 using dilute nitric acid.

Samples of the direct-print paper and the coated direct-print papers are exposed to the light of a xenon discharge tube for 2 microseconds (tube output rated at 50 joules-distance 30 inches). The samples are photodeveloped by exposure to fluorescent room lighting for 45 minutes. The samples are then bathed for 5 seconds in an aqueous alkaline solution (10% by weight solution of borax or NaOH) and dried.

The reflection densities to yellow light of the background and image areas are measured and the discrimination obtained i.e., image density minus background density. The samples are then exposed to fluorescent light of approximately 60 lumens/ft.$^2$ for 92 hours and discrimination is again measured. The initial and final discrimination values are tabulated in the table below.

| | Discrimination ($D_{max}-D_{min}$) | |
|---|---|---|
| Dye precursor | Initial | After 92 hr. exposure |
| (1) Control (none) | 0.38 | 0.06 |
| (2) p-Nitrophenol (2 g./l.) | 0.40 | 0.17 |
| (3) p-Nitrophenol (8 g./l.) | 0.40 | 0.17 |
| (4) 4-nitro-2, 6-dichlorophenol (1 g./l.) | 0.38 | 0.14 |
| (5) p-Diazo-diethylaniline (2.8 g./l.) and acetoacetanilide (3.6 g./l.) | 0.34 | 0.13 |
| (6) 2-nitro-4-n-octyl phenol (4 g./l.) | 0.41 | 0.10 |

EXAMPLE 2

Samples of a direct-print paper are coated on the emulsion side with a 7% gelatin solution containing 50 ml./liter of 10% sodium hydroxide solution and 1 gram/liter of bis(1-butyl-2,5-dimethyyl-3-pyrrole)methincyanine perchlorate. The latter is dissolved in 50 ml. of ethanol/gram of dye before addition to the gelatine solution.

The samples are exposed and photodeveloped as described in Example 1. One of the samples is then bathed for 5 seconds in a 10% citric acid solution and dried. The discrimination values of the samples are measured and then exposed to fluorescent light of 325 lumens/square foot intensity for 65 hours. The results are as follows:

| | Before fading test | After 65 hours at 325 f.c. |
|---|---|---|
| Control-uncoated | 0.36 | 0.04 |
| Control-coated but not acid treated | 0.38 | 0.05 |
| Coated paper-treated with acid solution | 0.36 | 0.09 |

EXAMPLE 3

A portion of direct-print paper similar to that used in Example 1 is coated on the emulsion side with 6 ml./square foot of a 5% gelatin solution containing 4 grams/liter of p-nitrophenol and having a pH of 1.9, and dried. Two samples of the resulting material of the invention are exposed and photodeveloped as described in Example 1. One of these samples is then bathed in a 4% borax solution for 5 seconds and dried. The image stability of both samples is then assessed by measuring the discrimination before and after exposure for 43 hours to fluorescent light illumination of 325 lumens/sq. foot intensity. The results obtained are as follows:

| | Discrimination | |
|---|---|---|
| | Initial | After exposure |
| Control (unbathed sample) | 0.44 | 0.03 |
| Bathed sample | 0.44 | 0.08 |

EXAMPLE 4

A coating composition is prepared by melting together at 50° C. 90.5 grams of pigskin gelatin, 760 ml. of a 12% solution of a polymeric mordant obtained by reacting polymerized methyl vinyly ketone with aminoguanidine and then reducing the product and then allowing the mixture to set. The gel obtained is shredded, washed for 6 hours in tap water and allowed to drain overnight. The washed gel is melted at 60° C., the pH adjusted to 4.5 with 6.0 N glycollic acid and the volume made up to 3500 ml. To a portion of the resulting mordant composition 4 grams/liter of p-nitrophenol dissolved in a little ethanol is added and the pH adjusted to 3.5. A length of the direct-writing paper used for Example 1 is then coated with this portion and dried to provide a material of the invention. Similar images were produced in samples of the coating by exposing them as described in Example 1.

In a first test one image-bearing sample of the material of the invention is bathed for 10 seconds in a 10% borax solution to form the dyed protective layer and dried and this and the control samples are exposed for 92 hours to fluorescent light of 60 lumens/sq. foot intensity.

In a second test image-bearing samples of the material of the invention are bathed for different times in a 4% borax solution, dried, and then exposed with the control sample for 68 hours to fluorescent light of 325 lumens/sq. foot intensity. The discrimination values for all the samples before and after the exposures used for assessing their stability are summarized below.

|  | Discrimination | |
|---|---|---|
|  | Initial | After exposure |
| Test 1: | | |
| Control | 0.38 | 0.06 |
| Bathed material of invention | 0.39 | 0.17 |
| Test 2: Control | 0.39 | 0 03 |
| Material of invention bathed for: | | |
| 5 seconds | 0.39 | 0 12 |
| 20 seconds | 0.39 | 0.14 |
| 80 seconds | 0.39 | 0.16 |

Similar results are obtained when the acid indicators Eosin yellow, Erythrosin and Resorufin are used and the borax solution is replaced with citric acid.

EXAMPLE 5

An element was prepared by a procedure of Example 4, the concentration of p-nitrophenol being 8 grams/liter and the pH of the coating composition being adjusted to 1.9 before use. The image stabilities of an unbathed (control) and a sample bathed for 5 seconds in a 4% borax solution were assessed by measuring the discrimination values of the images before and after exposure for 43 hours to illumination of 325 lumens/square foot intensity. The values obtained were:

|  | Discrimination | |
|---|---|---|
|  | Initial | After Exposure |
| Unbathed sample | 0.41 | 0.03 |
| Bathed sample | 0.40 | 0.12 |

EXAMPLE 6

Color coupler can be used in the supercoat of a photographic element to provide a filter layer. A solution of 1 gram of the yellow-dye-forming coupler 4-benzoylacetamide-3-methoxy(2',4'-di-t-amylphenoxy)acetanilide in 0.5 gram of di-n-butylphthalate coupler solvent is dispersed in 5 ml. of a 5% aqueous solution of photographic gelatin containing 0.1 ml. of saponin. The resulting dispersion is colloid milled 3 times and then added to 50 ml. of a 10% aqueous solution of photographic gelatin containing 0.4 ml. of saponin and 0.1 ml. of a 10% solution of formaldehyde. After the final addition of 20 ml. of distilled water, the preparation is supercoated on a direct-print-paper at the respective coverages/square foot of 116 mg. coupler, 58 mg. coupler solvent, and 610 mg. gelatin. The paper is exposed and photodeveloped as described in Example 1 and sequentially bathed for 5 seconds each in (1) a 1-liter aqueous solution containing 5 grams of the color-developing agent 2-amino-5-diethylaminotoluene·HCl, and (2) a 1-liter aqueous solution containing 10 grams of potassium ferricyanide.

The samples are subjected to 92 hours' exposure as described in Example 1. The samples with the color couplers exhibit improved results similar to the improvement with the dyes of Examples 1, i.e., at least a 15% improvement in discrimination.

In an alternate process the photodeveloped element is contacted with a single bath containing both the color-developing agent, 2-amino-5-diethylaminotoluene, and the oxidizing agent, potassium ferricyanide. Similarly, improved results are obtained with this treatment in fading tests.

The invention has been described in considerable detail with reference to prefered embodiments thereof, but it will be understood that variations and modifications can be effected within the spirit and scope of the invention as described hereinabove and as defined in the appended claims.

We claim:

1. A light-sensitive, direct-print, silver halide photographic element comprising (1) at least one light-sensitive, direct-print, silver halide layer, (2) a support and (3) a dye precursor layer, said dye precursor layer being further from said support than said silver halide layer and wherein asid layer contains a compound which is a precursor for a dye which absorbs radiation in the range of 300–460 millimicrons.

2. An element according to claim 1 wherein said precursor layer is further from said support than any silver halide layer.

3. An element according to claim 1 wherein said precursor layer is substantially free of silver halide.

4. An element according to claim 1 wherein said precursor layer comprises a compound which absorbs substantially no actinic radiation above about 300 millimicrons, said compound being a precursor for a dye which does not absorb substantial amounts of visible radiation above 500 millimicrons.

5. An element according to claim 1 wherein said silver halide layer comprises a silver halide, direct-print emulsion wherein the halide of said silver halide is predominantly bromide.

6. An element according to claim 5 wherein said emulsion contains silver halide grains having a predominant amount of sensitivity internal to said grains and wherein said emulsion contains a halogen acceptor.

7. An element according to claim 1 wherein said precursor layer contains a compound which can be converted to a dye by contact with an acidic or basic solution.

8. An element according to claim 1 wherein said dye formed from said precursor does not absorb substantial amounts of radiation above 500 millimicrons.

9. An element according to claim 1 wherein said precursor layer comprises a compound which can be converted to a dye by contact with an oxidized developer solution.

10. An element according to claim 1 wherein said precursor layer comprises p-nitrophenol.

11. An element according to claim 1 wherein said precursor layer comprises 4-nitro-2,6-dichlorophenol.

12. An element according to claim 1 wherein said precursor layer comprises a yellow, dye forming, open-chain coupler.

13. An element according to claim 1 wherein said precursor layer comprises an Eosin compound.

14. A process for providing a filter layer on a print-out or direct-print photographic element having a layer compising a dye-precursor positioned further from the support than any silver halide layer, said dye precursor being such that it absorbs substantially no actinic radiation above 300 millimicrons, said process comprising contacting said dye precursor with an activator solution which will convert said dye precursor to a dye which absorbs radiation up to 460 millimicrons.

15. The process according to claim 14 wherein said dye precursor is converted by contact with an acid solution.

16. The process according to claim 14 wherein said dye precursor is converted by contact with a basic solution.

17. In a light-sensitive, direct-print or print-out, silver halide photographic element, the improvement comprising a dye precursor layer, said dye precursor layer being positioned further from said support than any silver halide layer.

18. A photographic element according to claim 17 wherein said precursor layer comprises a compound which absorbs substantially no actinic radiation above about 300 millimicrons, said compound being a precursor for a dye which absorbs radiation in the range of 300–460 millimicrons.

19. An element according to claim 18 wherein the light-sensitive silver halide in said element contains silver halide grains having a predominant amount of radiation sensitivity internal to said grains and wherein said element contains gelatin and at least one other compound which is a halogen acceptor.

References Cited
UNITED STATES PATENTS

| | | | |
|---|---|---|---|
| 2,350,380 | 6/1944 | White | 96—68 XR |
| 2,369,469 | 2/1945 | Knott | 96—84 XR |
| 2,865,748 | 12/1958 | Feniak et al. | 96—84 XR |
| 3,110,717 | 11/1963 | Greenhalgh | 96—90 XR |

RONALD H. SMITH, Primary Examiner

U.S. Cl. X.R.

96—68